3,457,209
ALKYL ACRYLATE LATICES
Bela K. Mikofalvy, Sheffield Lake, Ohio, assignor to
The B. F. Goodrich Company, New York, N.Y., a
corporation of New York
No Drawing. Filed Dec. 30, 1966, Ser. No. 606,032
Int. Cl. C08f 15/40, 1/13
U.S. Cl. 260—29.6                                    24 Claims

ABSTRACT OF THE DISCLOSURE

Alkyl acrylate polymer latices are prepared by initially polymerizing lower alkyl acrylates and alpha, beta-olefinically unsaturated N-alkylol amides to form a base polymer, and then overpolymerizing olefinically unsaturated carboxylic monomers onto the base polymer. The resulting latices may be thickened by the addition of base which eliminates the necessity of adding natural or synthetic thickeners to the latex for treating fibrous materials, as binders and adhesives.

---

This invention relates to particular alkyl acrylate polymers. More particularly the invention relates to polymer latices of lower acrylate ester/alpha, beta-olefinically unsaturated N-alkylol amide copolymers overpolymerized with an olefinically unsaturated carboxylic acid.

Alkyl acrylate latices are well-known and have many industrial applications, most of which require high viscosity formulations. For example, paper, textile, upholstery fabric, rug and carpet back coatings, textile laminating, flock fabric adhesives as well as other adhesive applications all require the use of high viscosity latex systems to suspend pigments, obtain suitable flow properties and prevent rapid soaking. Since the alkyl acrylate latices are normally very fluid, thickening agents must be used to increase the viscosity to the desired level for certain applications. Water soluble salts of poly(acrylic acid) and poly(methacrylic acid), copolymers of these acids with lower alkyl acrylates, natural gums such as alginates, proteins such as casein and cellulose derivatives such as hydroxyethyl cellulose are typically used throughout the industry as thickening aids.

The acrylic and methacrylic acid/acrylate ester copolymers are an important class of materials used to enhance latex viscosity, being offered in both latex and dry powder form, however, they are not without disadvantages. Dusting is a problem with such thickeners in powder form. Also the powders are hygroscopic, have relatively slow rates of solution and the resulting thickened latices have poor shelf life. Thickening agents of this type in latex form require dilution and mixing, thereby adding additional steps which increase the processing costs. In addition, with both types of external thickeners there are specific latices carefully designed to meet rigid specifications which are not compatible with a given thickener and as a result the latex properties are adversely affected. It is therefore desirable to have a method for developing viscous acrylate based latex systems without the addition of natural or synthetic polymeric thickeners.

I have now discovered such a method, a means whereby extremely high viscosities are achieved in certain acrylate latex systems without the use of the usual thickening agents. This is accomplished by overpolymerizing or grafting a small amount of an olefinically unsaturated carboxyl-contatining monomer on an alkyl acrylate/alpha, beta-olefinically unsaturated N-alkylol amide interpolymer, then adjusting the pH of the latex by the addition of an alkaline material to obtain the desired increase in viscosity. The latices obtained in this manner have excellent thickening efficiency, that is, for an equivalent carboxyl concentration, higher viscosities are developed than with latices thickened by addition of acrylic or methacrylic acid/acrylate ester copolymer thickeners; or with acrylate ester polymers not containing the N-alkylol amide monomer but over-polymerized with carboxyl-containing monomers.

The stable latices of the present invention are obtained by first polymerizing about 50–95% by weight based on the total monomers of a lower alkyl acrylate with about 0.5–15% by weight of an alpha, beta-olefinically unsaturated N-alkylol amide and 0–49% by weight of one or more other polymerizable monomers to form a base polymer; and then overpolymerizing about 0.1–10% by weight of an olefinically unsaturated carboxylic acid monomer when the polymerization of the base polymer has reached at least about 50% completion. Preferred polymer latices contain about 75–95% by weight of the lower alkyl acrylate ester, about 1–7% by weight N-methylol acrylamide or N-methylol methacrylamide, 0.5–6% by weight acrylic and/or methacrylic acid and less than 15% by weight of other polymerizable monomers. It is one of the advantages of this invention that better results are obtained when the polymerization is conducted at total emulsifier levels of about 3% by weight based on total monomers or less. Also, superior thickened latices result when the overpolymerization of the carboxyl-containing monomer is commenced when at least 70% by weight of the base monomers have polymerized.

The base polymer to be overpolymerized contains from about 50–95% by weight total monomers, and more generally about 75–95% by weight, of a lower alkyl acrylate or mixture of lower alkyl acrylates having the structural formula

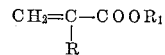

wherein R is hydrogen or a methyl group and $R_1$ represents an alkyl radical having from 1 to 8 carbon atoms. Representative monomers of the foregoing type include methyl acrylate, ethyl acrylate, the propyl acrylates and the butyl acrylates, 2-methylhexyl acrylate, n-octyl acrylate, 2-ethylhexyl acrylate, methyl methacrylate, ethyl methacrylate, octyl methacrylate and the like.

Polymerized with the alkyl acrylates to form the base polymers is about 0.5–15% by weight, and preferably 1–7% by weight of an alpha, beta-olefinically unsaturated N-alkylol amide having the structural formula

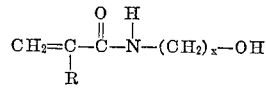

wherein R is hydrogen or an alkyl group containing 1 to 4 carbon atoms and x is a number from 1 to 4. Examples of the N-alkylol amides embodied herein include: N-methylol acrylamide, N-ethanol acrylamide, N-propanol acrylamide, N-methylol methacrylamide, N-ethanol methacrylamide and the like. The N-alkylol amide monomers are an essential part of this invention, because without these monomers, thickening efficiencies of the overpolymerized polymer latices are greatly reduced. Also, the presence of these monomers increase the latex stability as well as reducing the amount of coagulum formed during polymerization. N-methylol acrylamide and N-methylol methacrylamide are particularly useful N-alkylol amide monomers, especially when copolymerized with ethyl acrylate, n-butyl acrylate, 2-ethylhexyl acrylate or methyl methacrylate in the base polymer.

Useful base polymers can contain one or more other polymerizable monomers, preferably vinylidene $$(CH_2=C<)$$

monomers, with the lower alkyl acrylate and the N-alkylol amide. Such polymerizable comonomers may constitute up to much as 49% by weight of the polymer. Such polymerizable monomers include conjugated dienes such as butadiene and isoprene; alpha-olefins such as ethylene, propylene and isobutylene; vinyl halides such as vinyl chloride, vinyl fluoride and vinylidene chloride; vinyl esters such as vinyl acetate; vinyl aromatics such as styrene, α-methylstyrene, vinyl toluene, vinyl naphthalene; alkyl vinyl ethers such as methyl vinyl ether, isopropyl vinyl ether, n-butyl vinyl ether and isobutyl vinyl ether; acrylic acid, methacrylic acid, ethacrylic acid, acrylonitrile, methacrylonitrile, acrylamide, methacrylamide, N - isopropylacrylamide, N-isopropylmethacrylamide, N-tert-butylacrylamide, N-tert-butylmethacrylamide and the like.

The acid monomers useful in the overpolymerization of the polymer latices are the olefinically unsaturated carboxylic acids which contain at least one carbon-carbon olefinic double bond, and at least one carboxyl group, that is, an acid which contains an olefinic double bond susceptible to polymerization by virtue of it being in the alpha, beta-position with respect to the carboxyl group (>C=C—COOH) or a terminal methylene grouping (CH$_2$=C<). The close proximity of the strongly polar carboxyl group to the carbon-carbon double bond of the alpha-beta acids has a strong activating influence rendering monomers containing this structure very readily polymerizable and therefore especially attractive. This grouping in a carboxylic monomer renders it more easily polymerizable than if the double bond were intermediate in the carbon structure. Examples of the olefinically-unsaturated acids of this broad class includes such widely divergent materials as the acrylic acids such as acrylic acid itself, methacrylic acid, ethacrylic acid, α-chloroacrylic acid, α-cyanoacrylic acid, crotonic acid, β-acryloxy propionic acid, hydrosorbic acid, sorbic acid, α-chlorosorbic acid, cinnamic acid, β-styryl acrylic acid, hydromuconic acid, itaconic acid, citraconic acid, fumaric aid, mesaconic acid, muconic acid, glutaconic acid, aconitic acid and the like. Also useful in the present invention are acid anhydrides, such as maleic anhydride, wherein the anhydride group is formed by the elimination of one molecule of water from two carboxyl groups located on the same polycarboxylic acid molecule. Also, mixtures of two or more of the above-mentioned carboxylic monomers may be employed for the overpolymerization.

To obtain efficient thickening of the polymer latices of this invention, more than about 0.1% by weight of the olefinically unsaturated carboxylic acid is overpolymerized. A particularly useful range is between about 0.5–6% by weight. In general, the carboxyl containing monomer will not exceed about 10% by weight.

In conducting the overpolymerization, the carboxyl-containing monomer may be overpolymerized by itself, or other polymerizable monomers in large amounts can be combined with the carboxyl-containing monomer. Useful polymers are obtained when the other polymerizable monomers are vinylidene monomers employed in amounts so that the weight ratio of the vinylidene comonomer to the acid monomer overpolymerized is less than about 5:1. Excellent overpolymerizations have been obtained when the vinylidene comonomer to acid monomer weight ratio is maintained at 1:1 or below. The technique of combining comonomers with the carboxylic monomer is especially useful to obtain stable overpolymerizations and latices when the overpolymerization is delayed until high conversions of the base monomers is achieved. In general, the same monomers which can be interpolymerized with the acrylate ester and N-alkylol amide to form the base polymer, also serve as useful comonomers with the acid monomer in the overpolymerization step. Small amounts of alkyl acrylates, such as ethyl acrylate and methyl acrylate, have been found especially useful comonomers to be overpolymerized with the acid monomers. In addition to the usual vinylidene comonomers, small amounts of polyfunctional compounds such as methylene-bis-acrylamide, ethylene glycol dimethacrylate, diethylene glycol diacrylate, allyl pentaerythritol, divinyl benzene and the like may also be included in the overpolymerization. By including these vinylidene monomers and polyfunctional compounds capable of cross-linking with the acid monomers during the overpolymerization, latices with excellent stability and capable of developing extremely high viscosities upon the addition of base are obtained.

The overpolymerization or grafting of the acid monomers onto the alkyl acrylate/N-alkylol amide base polymer may be commenced when the polymerization of the base polymer is complete or essentially so, or more generally, the overpolymerization is conveniently begun after about 50% conversion of the base monomers has been achieved. Preferably, the overpolymerization is delayed until about 70% or more of the monomers comprising the base polymer is polymerized.

The polymerization process is conducted at a pH less than 7 and generally at a pH from about 1.5 to 5. The pH of the resulting acrylate latices may be increased by the addition of base at the end of the polymerization or at the time of its use to obtain the desired thickening effect. In general, the viscosity of the latex increases as the pH of the latex is raised. As the pH increases the viscosity increases and within the range of about pH 5–9 the viscosity increases very rapidly. At about pH 10 and above the change in viscosity again becomes less significant. It is a particularly important aspect of this invention that for a latex with a given total solids content, the viscosity of the latex may be varied within a wide range simply by regulating the pH of the latex, and conversely, at a given pH a wide variety of latex viscosities are obtainable by regulating the solids content of the latex. To increase the pH of the latices any of the well-known bases may be used. For example, sodium, potassium or ammonium hydroxide, ammonia, various amines such as methylamine, ethylamine, diethylamine, ethanolamine, morpholine and similar basic compounds are employed.

Conventional polymerization techniques are employed to prepare the self-thickening acrylate latices of this invention. Generally, the polymerization is conducted at a temperature of about 20–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. Heavy metal ions may also be used to activate the persulfate catalyzed polymerizations. Latices having exceptional stability with low amounts of coagulum are obtained with alkali metal and ammonium persulfate initiated polymerizations. The amount of initiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the latices of this invention, they are the general types of anionic and nonionic emulsifiers. Better results have been obtained with the anionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamine lauryl sulfate; alkali metal and ammonium sats of sulfonated petroleum or paraffin oils; sodium salts of aromatic sulfonic acids, such as dodecane-1-sulfonic acid and octadiene-1-sulfonic acid; aralkyl-sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used may be from about 0.01 to 6% or more by weight of the monomers. All the emulsifier may be added at the beginning of the polymerization or it may be added incrementally or by proportioning throughout the run. Typically, a substantial portion of the emulsifier is added at the start of the base polymer polymerization and the remainder when the overpolymerization with the carboxyl-containing monomers is commenced. Emulsifier free systems may also be employed to form the polymer latices of this invention.

Typical polymerizations for the preparation of the self-thickening acrylate latices of this invention are conducted by charging the monomers for the base polymer into the polymerization reactor which contains water and a portion of the emulsifying agent. The reactor and its contents are heated and the initiator added. At the desired point in the polymerization the aqueous premix containing the carboxyl-containing monomer and any other monomers to be overpolymerized and the remainder of the emulsifier is charged. Throughout the initial polymerization and the overpolymerization the temperature is maintained with a cooling bath. Excellent results have been obtained when the base monomers and emulsifier are combined to form an aqueous premix and about 5–15% by weight of this premix is charged and the remainder of the premix proportioned into the reactor at a uniform rate until the base polymerization is complete. It is believed that such monomer preemulsification and seeding techniques avoid serious heat transfer problems, thus giving better control of the particle size of the base polymer and a more stable latex. The subsequent overpolymerization results in more efficient latices.

Latex viscosities are typically measured with a Brookfield RVF viscometer at 20 r.p.m. with appropriate spindles. The stability of the latex is obtained by agitating the latex for five minutes at high sheer with a blender followed by filtering, and determining the amount of coagulum formed.

The following examples serve to illustrate the invention more fully, however, they are not intended to limit the scope thereof. All parts or percentages are by weight unless noted otherwise.

EXAMPLE I

A base polymer of ethyl acrylate and N-methylol acrylamide overpolymerized with methacrylic acid was prepared according to the following recipe:

| | Parts |
|---|---|
| Ethyl acrylate | 94.5 |
| N-methylol acrylamide | 2.5 |
| Methacrylic acid | 3 |
| Water | 97 |
| Sodium lauryl sulfate | 0.3 |
| Ammonium persulfate | 0.26 |

The polymerization vessel was charged with about 63 parts water and about 10–15% of a premixed solution containing 30 parts water, the ethylacrylate and N-methylol acrylamide monomers and 0.2 part of emulsifier. The reactor and its contents were then heated to about 60–70° C. by the application of external heat and the ammonium persulfate dissolved in 1 part water was charged with vigorous agitation to initiate the polymerization. The remainder of the monomer premix was then proportioned into the reactor over a period of about one hour. The temperature of the reaction was maintained at about 80° C. during the monomer proportioning. Immediately following the proportioning, a second premix containing the methacrylic acid emulsified with 0.1 part sodium lauryl sulfate in 3 parts water was charged at a uniform rate for 15 minutes. At the completion of this charge, the polymerization was maintained for an additional hour at 80° C. to insure high conversion. The resulting fluid latex contained about 50% total solids with less than 0.01% coagulum based on the total polymer formed and had a viscosity of about 50 cps. Also, the latex had excellent stability. The pH of a sample of the original latex was adjusted to about 9.5 by the addition of ammonium hydroxide and found to have a viscosity of 1,480,000 cps. (a plastic state). When the original latex was diluted with water to about 30% total solids, the latex viscosity at pH 9.5 was 2,700 cps.

When ethyl acrylate was polymerized using the same recipe but without the N-methylol acrylamide, and the overpolymerization attempted with 3 parts methacrylic acid, the entire charge coagulated.

EXAMPLE II

To demonstrate the criticality of overpolymerizing the acid monomer over the base polymer, Example I was repeated in an identical manner, except that the methacrylic acid was polymerized with the ethyl acrylate and N-methylol acrylamide in the normal manner, by charging together, instead of being overpolymerized as taught in this invention. When the pH of the resulting latex was adjusted to 9.5 with ammonium hydroxide, the viscosity was only 3200 cps. Diluted to 30% total solids, the latex had a viscosity of 16 cps. at pH 9.5.

EXAMPLES III–IV

To demonstrate the versatility of the present invention base polymers containing two acrylate esters were prepared according to the procedure described in Example I. The polymerization recipes were as follows:

| | III | IV |
|---|---|---|
| Ethyl acrylate | 48.8 | 45.8 |
| 2-ethylhexyl acrylate | 45 | 45 |
| N-methylol acrylamide | 1.8 | 1.8 |
| Acrylonitrile | | 3 |
| Acrylamide | 1.8 | 1.8 |
| Methacrylic acid | 2.6 | 2.6 |
| Water | 97 | 97 |
| Sodium lauryl sulfate | 0.3 | 0.3 |
| Ammonium persulfate | 0.26 | 0.26 |

Both latices showed good stability and had viscosities less than 100 cps. at about 50% total solids. The pH of the latex of Example III was raised to 9.5 by the addition of ammonium hydroxide and the viscosity measured and found to be over 1,000,000 cps. At pH 6.2, the viscosity of the latex of Example IV was 100,000 cps.

EXAMPLE V

A polymer latex based on n-butyl acrylate was prepared from the following ingredients:

| | Parts |
|---|---|
| n-Butyl acrylate | 80.9 |
| N-methylol acrylamide | 1.5 |
| Acrylonitrile | 12 |
| Acrylamide | 3.5 |
| Methacrylic acid | 2.6 |
| Water | 97 |
| Sodium lauryl sulfate | 0.3 |
| Ammonium persulfate | 0.26 |

The polymerization techniques employed were the same as described in Example I. The resulting polymer latex contained about 48% total solids and has a viscosity less than 50 cps. Upon addition of sufficient ammonium hydroxide to raise the pH of the latex to 9.5, the viscosity was increased to 76,000 cps.

EXAMPLES VI–VII

Overpolymerization with other carboxylic acid monomers was demonstrated by preparing in the same manner a base polymer of ethyl acrylate, N-methylol acrylamide, acrylonitrile and acrylamide and then overpolymerzing with acrylic acid and itaconic acid. The recipes were as follows:

|  | VI | VII |
|---|---|---|
| Ethyl acrylate | 89 | 91.9 |
| N-methylol acrylamide | 1.9 | 1.8 |
| Acrylonitrile | 2.8 | 2.7 |
| Acrylamide | 1.9 | 1.8 |
| Acrylic acid |  | 2.6 |
| Itaconic acid | 2.6 |  |
| Ethyl acrylate | 2.1 |  |
| Methylene-bis-acrylamide | 0.005 | 0.005 |
| Water | 97 | 98 |
| Sodium lauryl sulfate | 0.3 | 0.3 |
| Ammonium persulfate | 0.26 | 0.26 |

Both latices contained about 50% total solids and showed excellent stability. The resulting latex from Example VI had a viscosity of 60 cps. at pH 3. The pH of the latex was raised to 9.2 by the addition of ammonium hydroxide and the viscosity then found to be 5,250 cps. Viscosites were obtained at varying total solids levels for the latex of Example VII. Data is set forth in Table I.

TABLE I

| Percent total solids | pH | Viscosity (cps.) |
|---|---|---|
| 50 | 2.8 | 155 |
| 50 | 9.2 | >1,000,000 |
| 40 | 9.2 | 100,000 |
| 30 | 9.2 | 4,300 |
| 20 | 9.2 | 85 |
| 20 | 3.2 | 10 |

EXAMPLE VIII

Using the general procedure described in the previous examples, methacrylic acid, ethyl acrylate and the methylene-bis-acrylamide were overpolymerized onto a base polymer comprised of ethyl acrylate, acrylonitrile, acrylamide and N-methylol acrylamide in accordance with the following recipe:

|  | Parts |
|---|---|
| Ethyl acrylate | 87 |
| Acrylonitrile | 3 |
| Acrylamide | 2 |
| N-methylol acrylamide | 2 |
| Methacrylic acid | 3 |
| Ethyl acrylate | 3 |
| Methylene-bis-acrylamide | 0.005 |
| Water | 97 |
| Sodium lauryl sulfate | 0.3 |
| Ammonium persulfate | 0.26 |

The resulting latex had excellent stabiilty. Portions of the original latex containing about 50% solids were diluted to 10, 20 and 30% total solids and the viscosities measured at several pH's. The viscosity data obtained is set forth in Table II.

| Viscosity (cps.) | Latex total solids | | | |
|---|---|---|---|---|
|  | 10% | 20% | 30% | 50% |
| At pH 3 | 5 | 10 | 15 | 400 |
| At pH 7 | 100 | 7,000 | 400,000 | >1,000,000 |
| At pH 9 | 500 | 20,000 | >1,000,000 | >1,000,000 |

EXAMPLE IX

To illustrate the improved results obtained with the latices of this invention, a direct comparison was made with latices thickened with a conventional post-thickening agent. A polymer latex, hereinafter referred to as latex A, was prepared according to the procedure and recipe described in Example VIII, except that 2.6 parts methacrylic acid were overpolymerized in place of 3 parts. A second polymer latex was then prepared according to the recipe described in Example VIII, but with the methacrylic acid omitted. To this latex was added an amount of an acrylate ester/methacrylic acid polymer emulsion thickening agent containing 55% by weight ethyl acrylate, 15% by weight methyl acrylate and 30% by weight methacrylic acid. The amount of thickener added was calculated to give 2.6 parts methacrylic acid in the resulting latex blend. The latex blend is hereinafter referred to as latex blend B.

Both the latex A and latex blend B were then diluted with water to 20% total solids and the pH raised to 9.5 by the addition of ammonium hydroxide. It was observed that the viscosity of latex A was 50% greater than the viscosity of the latex blend B. In addition to the lower viscosity, latex blend B also had a tendency to separate after a relatively short time, in contrast to latex A which maintained its stability for the length of the test.

EXAMPLE X

To illustrate the exceptional stability of the thickened polymer latices upon aging, a polymer latex derived from base polymers prepared in accordance with the procedure in Example I and containing 90.5 parts ethyl acrylate, 2.8 parts acrylonitrile, 1.8 parts acrylamide and 1.8 parts N-methylol acrylamide overpolymerized with 2.3 parts methacrylic acid, 0.8 part methyl acrylate and 0.005 part methylene-bis-acrylamide were diluted to 25% total solids. Portions of the diluted latex were then adjusted to intermediate pH's with 28% ammonium hydroxide and allowed to stand at room temperature for 48 days. Viscosities were measured at regular intervals and are set forth in Table III.

TABLE III

| Latex pH | Viscosity (cps.) | | | |
|---|---|---|---|---|
|  | After 4 days | After 8 days | After 17 days | After 48 days |
| 6.7 | 24 | 28 | 44 | 45 |
| 7.3 | 1,150 | 1,400 | 1,500 | 1,500 |
| 8.0 | 6,000 | 7,000 | 7,500 | 8,000 |
| 8.5 | 12,000 | 13,000 | 13,000 | 13,000 |

EXAMPLE XI

A polymerization was conducted to demonstrate the ability to overpolymerize the carboxylic acid monomers when the polymerization of the base polymer is not complete. Ingredients used were as follows:

|  | Parts |
|---|---|
| Ethyl acrylate | 88.5 |
| N-methylol acrylamide | 1.9 |
| Acrylonitrile | 2.8 |
| Acrylamide | 1.9 |
| Methacrylic acid | 3 |
| Methyl acrylate | 0.8 |
| Methylene-bis-acrylamide | 0.005 |
| Water | 99 |
| Sodium lauryl sulfate | 0.3 |
| Ammonium persulfate | 0.26 |

The polymerization procedure employed was the same as described in Example I, except that when the base polymerization reached about 75% conversion of the monomers, the overpolymerization was started, i.e., as the last 25% of the premix containing the base monomers was metered into the reactor, the premix containing the methacrylic acid to be overpolymerized was also being metered. Metering rates of the two premixes were maintained so that the charging of the base monomers was completed about 15 minutes before the methacrylic acid monomer premix charge. The latex was then diluted to about 20% total solids, the pH raised to about 9.3 by the addition of base and the viscosity measured and found to be 77,000 cps.

It is evident from the examples above that extremely useful latices which are capable of being thickened without the addition of natural or synthetic thickening agents can be prepared by the overpolymerization of carboxyl-containing monomers onto a base polymer comprised of a lower alkyl acrylate and an alpha, beta-olefinically unsaturated N-alkylol amide. To thicken the latices of this invention all that is required is to raise the pH by the addition of base. These polymer latices have good stability in both the thickened or unthickened states and a wide range of viscosities can be achieved at a given solids content by varying the pH of the latex or at a given pH by changing the solids content. Also, the polymer composition may be varied within wide limits to obtain polymer latices with widely divergent properties and applications. The viscosities of the thickened latices remain constant for long periods at a given pH and is not subject to constant increase of the viscosity up to the maximum as many latices thickened with external thickening agents are. Neither do the polymer latices of this invention separate on long-term aging. In addition to the above-mentioned advantages, it has been shown that the latices prepared by overpolymerization with carboxyl-containing monomers are capable of developing much higher viscosities than similar polymer latices to which an equivalent amount of thickening agent has been added.

The thickened alkyl acrylate latices prepared as described in the foregoing examples have been found to be particularly useful in many applications where thickened latices are required or of advantage, as, for example, impregnating paper and nonwoven fabric; and as fabric coatings for laminating fabric, and as carpet backings, without the problems associated with standard latices thickened by means of added thickening agents.

I claim:

1. An aqueous emulsion comprising a polymer of about 50 to 95% by weight based on total monomers of at least one lower alkyl acrylate having the formula

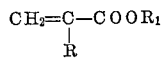

in which R is a hydrogen or a methyl group and $R_1$ is an alkyl radical having from 1 to 8 carbon atoms polymerized with about 0.5 to 15% by weight of an alpha, beta-olefinically unsaturated N-alkylol amide of the formula

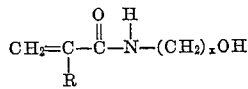

in which R is a hydrogen or an alkyl group containing 1 to 4 carbon atoms and $x$ is a number from 1 to 4, said polymer overpolymerized with about 0.1 to 10% by weight of an olefinically unsaturated carboxylic acid monomer.

2. The aqueous emulsion of claim 1 wherein 0 to about 49% by weight of other vinylidene comonomers are interpolymerized with the lower alkyl acrylate, the alpha, beta-olefinically unsaturated N-alkylol amide and the olefinically unsaturated carboxylic acid monomers.

3. The aqueous emulsion of claim 2 wherein the lower alkyl acrylate is ethyl acrylate, n-butyl acrylate, 2-ethylhexyl acrylate or methyl methacrylate.

4. The aqueous emulsion of claim 2 wherein the alpha, beta-olefinically unsaturated N-alkylol amide is N-methylol acrylamide or N-methylol methacrylamide.

5. The aqueous emulsion of claim 2 wherein the olefinically unsaturated carboxylic acid monomer is acrylic acid or methacrylic acid.

6. The aqueous emulsion of claim 2 wherein the vinylidene comonomers are acrylonitrile, acrylamide, methacrylamide or methylene-bis-acrylamide.

7. The aqueous emulsion of claim 6 wherein the weight ratio of the vinylidene comonomer to the olefinically unsaturated carboxylic acid monomer is less than about 5:1.

8. The aqueous emulsion of claim 2 wherein from about 75 to 95% by weight of one or more lower alkyl acrylates, 1 to 7% by weight of an alpha, beta-olefinically unsaturated N-alkylol amide are overpolymerized with about 0.5 to 6% by weight of an olefinically unsaturated carboxylic acid monomer.

9. The aqueous emulsion of claim 8 wherein less than about 15% by weight of other vinylidene comonomers are interpolymerized with the lower alkyl acrylate, the alpha, beta-olefinically unsaturated N-alkylol amide and the olefinically unsaturated carboxylic acid monomers.

10. The aqueous emulsion of claim 8 wherein the overpolymerization of the olefinically unsaturated carboxylic acid monomer is commenced when at least 70% by weight of the lower alkyl acrylate and alpha, beta-olefinically unsaturated N-alkylol amide have polymerized.

11. The aqueous emulsion of claim 9 wherein the lower alkyl acrylate is ethyl acrylate, the alpha, beta-olefinically unsaturated N-alkylol amide is N-methyl acrylamide and the olefinically unsaturated carboxylic acid is methacrylic acid.

12. A polymer composition comprising from about 50 to 95% by weight based on total monomers of at least one lower alkyl acrylate having the formula

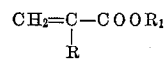

in which R is a hydrogen or a methyl group and $R_1$ is an alkyl radical having from 1 to 8 carbon atoms, and about 0.5 to 15% by weight of an alpha, beta-olefinically unsaturated N-alkylol amide of the formula

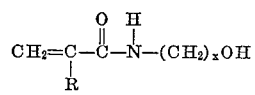

in which R is a hydrogen or an alkyl group containing 1 to 4 carbon atoms and $x$ is a number from 1 to 4, overpolymerized with about 0.1 to 10% by weight of an olefinically unsaturated carboxylic acid monomer.

13. A polymer of claim 12 which contains 0 to about 49% by weight of one or more other vinylidene monomers.

14. A polymer of claim 13 wherein the lower alkyl acrylate is ethyl acrylate, n-butyl acrylate, 2-ethylhexyl acrylate or methyl methacrylate.

15. A polymer of claim 13 wherein the alpha, beta-olefinically unsaturated N-alkylol amide is N-methylol acrylamide or N-methylol methacrylamide.

16. A polymer of claim 13 wherein the olefinically unsaturated carboxylic acid monomer is acrylic acid or methacrylic acid.

17. A polymer of claim 13 wherein vinylidene monomers are acrylonitrile, acrylamide, methacrylamide or methylene-bis-acrylamide.

18. A polymer of claim 13 which contains about 75 to 95% by weight of one or more lower alkyl acrylates, 1 to 7% by weight of an alpha, beta-olefinically unsaturated N-alkylol amide and about 0.5 to 6% by weight of an olefinically unsaturated carboxylic acid monomer overpolymerized.

19. The polymer of claim 18 wherein the lower alkyl acrylate is ethyl acrylate, the alpha, beta-olefinically unsaturated N-alkylol amide is N-methylol acrylamide and the olefinically unsaturated carboxylic acid is methacrylic acid and which contains less than about 15% by weight other vinylidene comonomers.

20. An emulsion polymerization process for the production of latices which comprises first polymerizing about 50 to 95% by weight based on total monomers of at least one lower alkyl acrylate having the formula

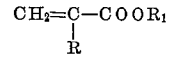

in which R is a hydrogen or a methyl group and $R_1$ is an alkyl radical having from 1 to 8 carbon atoms, with about 0.5 to 15% by weight of an alpha, beta-olefinically unsaturated N-alkylol amide of the formula

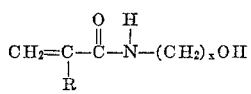

in which R is a hydrogen or an alkyl group containing 1 to 4 carbon atoms and $x$ is a number from 1 to 4, until about 50% by weight of the monomers have been polymerized, and then overpolymerizing about 0.1 to 10% by weight of an olefinically unsaturated carboxylic acid monomer.

21. The process of claim 20 wherein 0 to about 49% by weight of other vinylidene comonomers are interpolymerized with the lower alkyl acrylate, the alpha, beta-olefinically unsaturated N-alkylol amide and the olefinically unsaturated carboxylic acid monomers.

22. The process of claim 21 wherein the lower alkyl acrylate is ethyl acrylate, n-butyl acrylate, 2-ethylhexyl acrylate or methyl methacrylate; the alpha, beta-olefinically unsaturated N-alkylol amide is N-methylol acrylamide or N-methylol methacrylamide; the olefinically unsaturated carboxylic acid monomer is acrylic acid or methacrylic acid; and the vinylidene comonomers are acrylonitrile, acrylamide, methacrylamide or methylene-bis-acrylamide.

23. The process of claim 22 wherein from about 75 to 95% by weight of one or more lower alkyl acrylates, 1 to 7% by weight of an alpha, beta-olefinically unsaturated N-alkylol amide are overpolymerized with about 0.5 to 6% by weight of an olefinically unsaturated carboxylic acid monomer.

24. The process of claim 22 wherein the overpolymerization of the olefinically unsaturated carboxylic acid monomer is commenced when at least 70% by weight of the lower alkyl acrylate and alpha, beta-olefinically unsaturated N-alkylol amide have polymerized, the total emulsifier employed is less than about 3% by weight based on total monomers and the polymerization initiator is an alkali metal or ammonium persulfate.

References Cited
UNITED STATES PATENTS

| | | |
|---|---|---|
| 3,231,533 | 1/1966 | Garrett et al. |
| 3,296,175 | 1/1967 | Fantl et al. |
| 3,301,806 | 1/1967 | Guziak et al. |

SAMUEL H. BLECH, Primary Examiner

W. J. BRIGGS, Sr., Assistant Examiner

U.S. Cl. X.R.

117—140, 155, 161; 260—29.4, 851, 885